Sept. 23, 1969  ICHIRO KIMURA ET AL  3,468,332
DEVICE OPERATIVE IN ACCORDANCE WITH DIFFERENTIAL PRESSURE
Original Filed March 16, 1965  2 Sheets-Sheet 1

INVENTORS
Ichiro Kimura
Takeo Nagata

By Paul M. Craig, Jr.

ATTORNEY

Sept. 23, 1969  ICHIRO KIMURA ET AL  3,468,332
DEVICE OPERATIVE IN ACCORDANCE WITH DIFFERENTIAL PRESSURE
Original Filed March 16, 1965  2 Sheets-Sheet 2
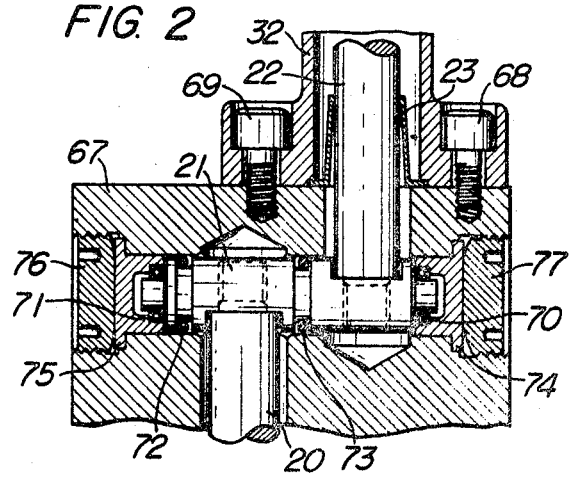
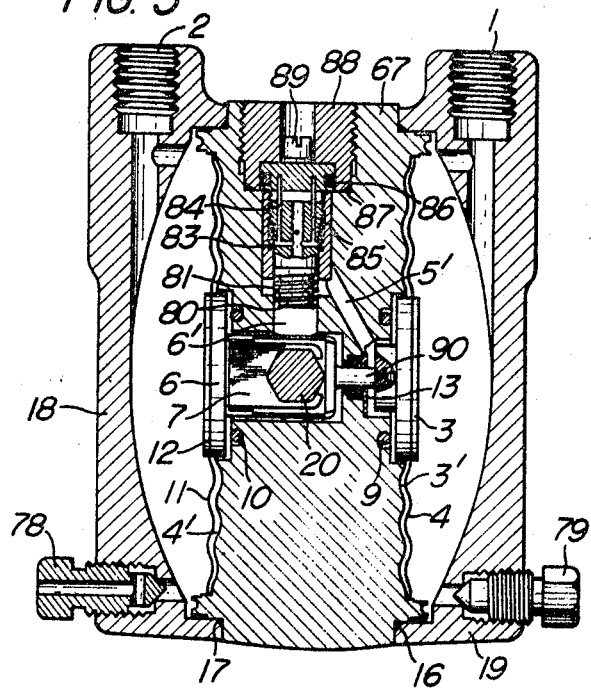
INVENTORS
Ichiro Kimura
Takeo Nagata
By Paul M. Craig, Jr.
ATTORNEY United States Patent Office 3,468,332
Patented Sept. 23, 1969

3,468,332
DEVICE OPERATIVE IN ACCORDANCE WITH DIFFERENTIAL PRESSURE
Ichiro Kimura and Takeo Nagata, Hitachi-shi, Japan, assignors to Hitachi, Ltd., Tokyo, Japan
Continuation of application Ser. No. 440,255, Mar. 16, 1965. This application Sept. 11, 1968, Ser. No. 766,363
Claims priority, application Japan, Mar. 16, 1964, (Utility model), 39/20,009; May 21, 1964, 39/28,505
Int. Cl. F15b 5/00; G05d 16/00
U.S. Cl. 137—85                                    3 Claims

ABSTRACT OF THE DISCLOSURE

The present disclosure relates to a device operative in accordance with differential pressure which can accurately measure differential pressure without being accompanied by static pressure errors and change of zero point. Devices operative in accordance with differential pressure are mostly employed in industrial fields to measure flow, pressure, liquid level, etc., and to convert measured differential pressures into equivalent air pressure values to thereby make suitable indicators, recorders or controlling means function. The mechanical motion between a fluid pressure-mechanical movement transducer and a mechanical movement-air pressure transducer is transmitted through a sealed pivot shaft that is securely supported to prevent movement due to fluid pressure in the direction of its motion transmitting arms that would produce an error in the indicator. The mechanical movement-air pressure transducer has a feed-back bellows containing therein a zero adjustment screw.

---

Figure 1:
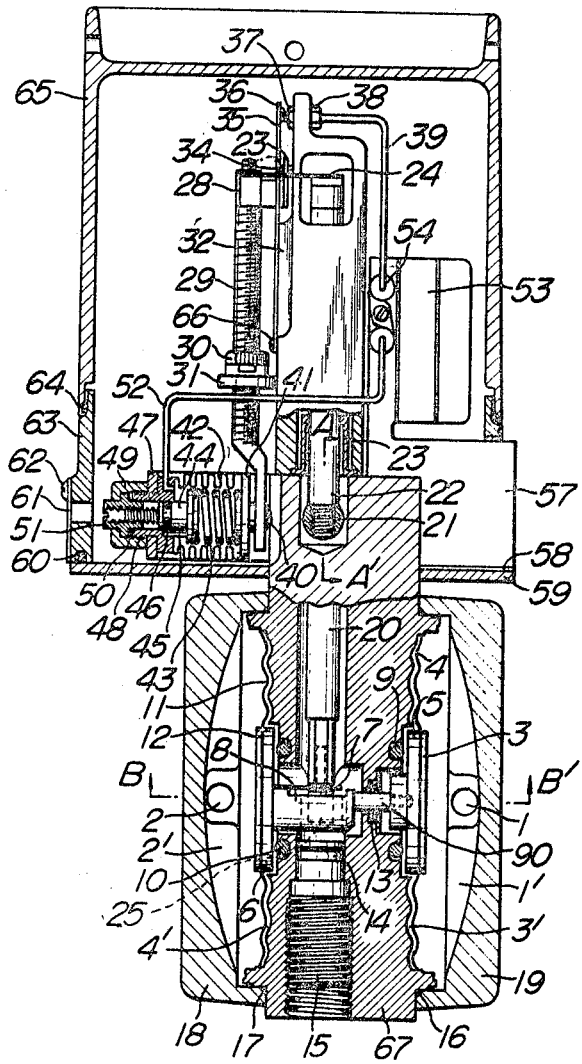

This application is a continuation of application Ser. No. 440,255 filed Mar. 16, 1965, now abandoned.

Such devices as mentioned above sometimes have to deal with fluids of which absolute pressures are as high as several hundred atmospheres, though differential pressure values to be measured are very small. In conventional devices, on the upper end portion of a force transmission rod a pair of leaf springs is attached at one end of each of the leaf springs and the other ends of such springs are connected to a base fixed to the housing of the device so that the axial movement of the force transmission rod may be prevented. However, such a conventional method has not been free from various defects; for instance, the tensile strength of a leaf spring causes to limit the pressure resistance of the device itself. Another defect of the conventional device is that a feed-back bellows and a zero-point adjusting spring are arranged parallel. In such an arrangement when the range nut is moved, the ratio of distance between the range nut and the feed-back bellows to that between the range nut and the zero-point adjusting spring changes. Accordingly, change of range is always accompanied by change of zero-point. There has been still another defect in the conventional device. The damper valve of the conventionl device is a mere combination of a valve and a valve seat. Therefore, minute adjustment of flow has been difficult to perform.

The present invention relates to a device operative in accordance with differential pressure which is free from any of the above stated defects. One of the objects of the present invention is to eliminate errors in measured values which may be otherwise caused by the absolute pressures of fluids to be measured by provision of a device operative in accordance with differential pressure which comprises a rotating rod rotatably fitted to the wall of a case, a unit secured to said rotating rod for sealing oil held in the case, a first and a second force transmission rod disposed in two opposite directions perpendicular to said rotating rod, a unit operative in accordance with differential pressure which is secured to said case and works in accordance with change of differential pressure to be measured to cause said first and second transmission rod about said rotating rod, and an air balancing system which is connected to said first force transmission rod outside said case and operates to exert on said first force transmission rod force having tendency to balance with the force exerted on said second force transmission rod by said unit operative in accordance with differential pressure.

Another object of the present invention is to enable varying of range without following change of zero point by providing a device operative in accordance with differential pressure which comprises a rotating rod rotatably fitted to the wall of a case, a unit secured to said rotating rod for sealing oil held in the case, a first and a second force transmission rod disposed in two opposite directions perpendicular to said rotating rod, a unit operative in accordance with differential pressure which is secured to said case and arranged to work in accordance with change of differential pressure to be measured to cause said first and said second force transmission rod about said rotating rod, a nozzle-flapper assembly to convert the movement of said first force transmission rod into air pressure, a pilot valve to amplify the variation of the back pressure of said nozzle-flapper assembly, a feed-back bellows to which a part of the output of said pilot valve is fed, a range rod to receive force of restitution from said feed-back bellows and transmit the same to said nozzle-flapper assembly, and a zero-point adjusting spring disposed in said feed-back bellows concentrically with the same so that the ratio of distance between the range nut of said range rod and the bellows to distance between the range nut and the zero-point adjusting spring may be constant irrespective of position of the range nut.

Still another object of the present invention is to provide a device operative in accordance with differential pressure, in which minute adjustment of flow of oil sealed in the device by means of a damper valve is possible, comprising a rotating rod rotatably fitted to the wall of a case, a unit secured to said rotating rod for sealing the oil held in the case, a first and a second force transmission rod disposed in two opposite directions perpendicular to said rotating rod, a pair of diaphragms movable in accordance with differential pressure to be measured, supporting plates to which the peripheral edges of said diaphragms are hermetically secured, a passage having a circular section connecting chambers formed inside said pair of diaphragms by the diaphragms and said supporting plates, a damper valve fitted tightly in said passage and movably transversely of the passage and having a tapered spiral groove cut thereon, and an air balancing system which is connected to said first force transmission rod outside said case and exerts on said first force transmission rod force having tendency to balance with the force exerted on said second force transmission rod by said pair of diaphragms.

Now, further details of the present invention will be given with reference to the accompanying drawings, in which FIG. 1 is a horizontal sectional view of a device operative in accordance with differential pressure embodying the present invention showing the general arrangement of diaphragms operative in accordance with differential pressure, force transmission rods and an air balancing system;

FIG. 2 is a fragmentary sectional view of the same seen from line A–A′ of FIG. 1 showing connection between a rotating rod and an upper and a lower force transmission rod; and FIG. 3 is a fragmentary sectional view of the same sene from line B–B' of FIG. 1 showing a damper valve in particular.

As readily understood from the drawings, the device according to the present invention substantially comprises a sealing case member, a sealing unit and an air balancing system.

First, referring to the sealing case member, numerals 1 and 2 indicated in the drawings respectively mean inlets for pressures, 4 and 11 diaphragms movable in accordance with differential pressure to be measured, 18 and 19 pressure-resisting flanges, and 16 and 17 packing members tightly inserted for sealing purpose between flanges and a pressure-receiving body 67. These members form pressure detecting chambers 1' and 2'. The diaphragms 4 and 11 are respectively provided with center plates 3 and 12 and other center plates 5 and 6 concentrically fixed on the surfaces of the diaphragms, the formers on the sides of the pressure detecting chambers and the latters on the opposite sides. The center plates 5 and 6 are preferably welded or tightly secured by means of screws to a connection member 8 so that the plates and the connection member may make one unit. A connection spring 7 is welded to the connection member 8. To the spring 7 a lower rod 20 is tightly secured by means of a screw 25. A high-pressure side liquid chamber 3' and a low-pressure side liquid chamber 4' are formed respectively between the pressure receiving body 67 and the diaphragms, the center plates and the connection member. These liquid chambers contain incompressible liquid of suitable viscosity sealed therein. O-rings 9 and 10 serve as stoppers respectively on the high pressure side and the low pressure side. The liquid chambers 3' and 4' are separated from each other by means of a liquid sealing O-ring 13 and the sliding portion 90 of the connection member 8 which is fitted in said O-ring. Numerals 5' and 6' indicate passages for guiding liquid from the liquid chambers 3' and 4' to a damper portion. A damper body 80 having a tapered spiral groove 81 is screwed in a sleeve 83 and is arranged to be rotated by pins 84 and 85 which are in turn rotated by a screw 89 which rotates sealing the liquid by means of an O-ring 86. 78 and 79 are exhaust ports for drain or vapor formed in the pressure detecting chambers 1' and 2'. These exhaust ports are preferable to be disposed in the lower portion of the transmission unit in the former case and in the upper portion in the latter case.

The sealing unit will be next explained. The sealing portion is located within the main body 67. A rotating rod 21 is rotatably supported by stainless steel bearing 70 and 71. Numerals 74 and 75 are bearing supports, and 76 and 77 are cover members of the bearing portion.

The lower rod and the upper rod mentioned hereinbefore are tightly secured to the rotating rod by means of screws. 72 and 73 indicate O-rings for sealing the low-pressure side liquid chamber from outside.

Then, the air balancing system will be described. A guide spring 24 is fixed to the upper end of the above-mentioned upper rod at one end and fixed to a range rod 29 at the other end. The range rod 29 is provided with a screw thread on its peripheral surface by means of which a nut 31 can be moved to any desired position along the range rod and is settled there by a lock nut 30. To the lower end portion of the range rod 29 are fixed an end plate 41 supporting one end of a feed-back bellows 42 and one end of a zero-point adjusting spring 43. The other end of the zero-point adjusting spring 42 is fixed to a threaded piece 44. An O-ring 46 is fitted on the threaded piece 44 to air-tightly seal the feed-back bellows and to arrange so that the threaded piece may advance forwardly into or backwardly out of the feed-back bellows by means of a screw 51 in order to change height of the spring 43. The feed-back bellows 42 is kept airtight and connected to the output chamber (not shown) of a pilot valve 53 through a conduct tube 52. A screw mounting member 23 is fixed to the upper end of the range rod 29 and provided with a flapper pushing screw 34 fixed thereto. One end of the flapper pushing screw pushes a flapper 35. The upper end portion of the flapper 35 is opposed to a nozzle 36. The nozzle 36 is connected to the input chamber (not shown) of the pilot valve 53 through a conduct tube 39.

The construction of the device according to this invention has been made apparent hereinbefore. Now the operation and the effects of this device will be mentioned. When different pressures are introduced into the pressure detecting chambers 1' and 2' through the inlet 1 and 2, the diaphragms 4 and 11 are pushed leftwards owing to the difference of pressure. As the liquid chamber 3' is separated from the liquid chamber 4' on the low-pressure side by the sliding portion 90 of the connection member 8 and the O-ring 13, only a small portion of the liquid within the liquid chamber 3 can leak out therefrom, and the remaining portion of the liquid flows to the low pressure side through the passage 5' and a passage formed between the spiral groove 81 and the wall of the main body 67 and then through the passage 6'. Accordingly, the connection member 8 fixed to the central portions of the diaphragms is made to move leftwards. The speed of the leftward movement of the connection member 8 is limited by the liquid resistance of the passage formed between the groove 81 of the damper 80 and the main body. More particularly, the sectional area of the liquid passage is made smaller by screwing-in of the damper 80 and made larger by screwing-off of the same. Because the groove is tapered in the manner that the depth of the groove becomes shallower towards the outward end of the damper. When the damper 80 is screwed in to the utmost, the sectional area of the groove is made so small that the liquid hardly flows, while when the damper 80 is screwed off to the utmost, the passages 5' and 6' are directly connected to each other and the groove exerts no resistance on the liquid. This damper means enables it to obtain any desired liquid resistance by changing the rotation angle of the screw 89. Additionally, compared with a conventional conical valve, this damper valve means can perform fairly minute adjustment of flow. Accordingly, in this device it is far easier than in conventional devices to adjust the speed of operation made in accordance with differential pressure or the frequency characteristic of the device minutely and in a wide range by adjusting the screw 89.

The movement of the connection member 8 in the leftward direction of FIG. 1 causes the lower rod 20 to move in the frontward direction of FIG. 2. Then the rotating rod 21 is made to rotate to push the upper end of the upper rod 22 in the backward direction of FIG. 2. It means that according to FIG. 1 the upper end of the upper rod 22 is pushed rightwards to pull the guide spring 24 hence the upper end of the range rod 29 rightwards. The screw 34 pushing the flapper 35 is also involved in the rightward movement to permit the flapper 35 to get near the nozzle 36. Then the volume of compressed air being discharged from the nozzle 36 is reduced, resulting in increase of pressure within the nozzle 36. The increase of pressure is amplified by the pilot valve 53 to become output pressure and sent out as output signals to means and devices which perform controlling, recording, adjusting etc. At the same time, a part of the output pressure is fed to the feed-back bellows 42. The increase of output pressure causes the bellows 42 to push the lower end of the range rod 29 in the rightward direction. This force makes the range rod 29 act as a lever on a fulcrum of the range nut 31. Since the force balances with the differential pressure to be measured which pulls the upper end of the range rod 29 rightwards, the variation of output air pressure is in proportion to the variation of input differential pressure.

In the device of this invention of which theory has been described above, even if the pressure within the liquid chambers becomes as high as or above 100 kg./cm.$^2$ owing to being exerted on with extremely high pressures compared with differential pressure to be measured, the pressure is sealed by means of the sealing O-rings 72 and 73, and thereby does not produce such force as pushes the pressure detecting system consisting of the lower rod 20, the rotating rod 21 and the upper rod 22 in the upper or any other direction. In devices employing conventional sealing means so called static pressure errors have been incidental because high pressure within such a device acts to push the upper rods outwardly. The device of this invention, however, is free from the trouble of static pressure error.

Since the spring 43 has force of restitution equivalent to the zero point 10.2 kg./cm.$^2$ or 3 p.s.i. of output pressure, this force is deducted from the force which is exerted on the lower end of the range rod 29 by the output pressure. The balance is the net force of restitution given by the bellows. The net force of restitution and force to be measured are compared with each other by means of a balance consisting of the range rod. The zero-point of the output air pressure is remained constant at 0.2 kg./cm.$^2$ or 3 p.s.i., while the position of the range nut varies with change of measuring range. Therefore, in a conventional device in which a zero-point adjusting spring and a bellows are disposed at different positions, change of the position of the range nut always follows destruction of balance between moment by the zero-point of output pressure and moment by the zero-point adjusting spring. Then the zero-point adjusting spring has to be re-adjusted. The device of this invention, however, does not require such re-adjustment.

It is claimed:

1. A device operative in response to differential pressure comprising: a sealed case member having a bore; a rotating rod mounted rotatably in said bore; a first force transmission rod having a lower end connected to one end of said rotating rod and extending generally perpendicular to said rotating rod; a second force transmission rod having an upper end connected to the other end of said rotating rod, and extending generally perpendicular to said rotating rod and opposite to said first force transmission rod; pressure sensitive means within said case member for determining a pressure differential and transmitting a control movement to said second force transmission rod; said pressure sensitive means having a member drivingly connected to the lower end of said second force transmission rod; two diaphragms forming respectively two pressure receiving chambers with said case member on respective one sides and being drivingly connected with said pressure sensitive means member; said diaphragms forming two closed liquid chambers respectively wtih their other sides and said case member for changing their volumes in response to pressure applied to said diaphragms in said pressure receiving chambers, and a passage connecting said two liquid chambers; damper means controlling the flow of the liquid between said liquid chambers, said damper means having a portion provided with a spiral groove projecting into said passage, the depth of said groove decreasing toward the outer end of said damper portion; a first sealing means engaging said bore and said rotating rod between said lower end of said first force transmission rod and said upper end of said second force transmission rod to seal the clearance between the inner wall of said bore and the outer surface of said rotating rod; a second sealing means engaging said bore and said rotating rod on the side of said upper end of said second force transmission rod opposite from said first sealing means; both of said sealing mean sealing the interior of said liquid chambers from an atmosphere and balancing axial fluid pressure forces acting upon said rotating rod by liquid within said liquid chambers; an air balancing means having a zero point adjusting means and connected to said first force transmission rod outside of said case member for exerting onto said first force transmission rod a force balancing the force exerted on said second force transmission rod by said pressure sensitive means operative in response to differential pressure.

2. The device operative in reponse to differential pressure according to claim 1, wherein said air balancing means comprises a nozzle-flapper means converting the movement of said first force transmission rod into air back pressure, a pilot means amplifying the variation of the back pressure of said nozzle-flapper means, a feedback bellows receiving a portion of the output of said pilot valve means, a range rod means transmitting the force of restitution transmitted thereto by said feedback bellows to said nozzle-flapper means and having a range nut, and a zero-point adjusting spring concentrically disposed in said feedback bellows and arranged so that the ratio of the distance between the range nut of the range rod means and the feedback bellows to the distance between the range nut and the zero-point adjusting spring is constant independently of the position of the range nut.

3. The device operative in response to differential pressure according to claim 2, including a first guide leaf spring force transmittingly connected at opposite ends between said first force transmission rod at its end opposite said rotating rod and said range rod means on the side of said range nut opposite from said feedback bellows; a second guide leaf spring force transmittingly connected at opposite ends between said lower end of said second force transmission rod and said pressure sensitive means member.

References Cited
UNITED STATES PATENTS

| | | | |
|---|---|---|---|
| 2,400,048 | 5/1946 | Jones | 92—10 |
| 2,762,392 | 9/1956 | Reese | 92—11 |
| 2,806,480 | 9/1957 | Bowditch | 137—86 X |
| 2,833,311 | 5/1958 | Baldelli | 138—93 |
| 2,879,802 | 3/1959 | Du Bois | 92—12 X |
| 3,165,262 | 1/1965 | Ollivier | 137—85 X |
| 3,266,516 | 8/1966 | Evans | 137—86 |

ALAN KOHAN, Primary Examiner

U.S. Cl. X.R.

92—9, 11